US012621798B2

(12) United States Patent
Wu et al.

(10) Patent No.: US 12,621,798 B2
(45) Date of Patent: May 5, 2026

(54) CHANNEL DETECTION METHOD AND APPARATUS, AND USER EQUIPMENT

(71) Applicant: VIVO MOBILE COMMUNICATION CO., LTD., Guangdong (CN)

(72) Inventors: Kai Wu, Guangdong (CN); Dajie Jiang, Guangdong (CN); Dongru Li, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 415 days.

(21) Appl. No.: 18/127,486

(22) Filed: Mar. 28, 2023

(65) Prior Publication Data

US 2023/0239835 A1      Jul. 27, 2023

Related U.S. Application Data

(63) Continuation of application No. PCT/CN2021/120647, filed on Sep. 26, 2021.

(30) Foreign Application Priority Data

Sep. 28, 2020      (CN) .......................... 202011043669.0

(51) Int. Cl.
*H04W 68/00*          (2009.01)
*H04L 5/00*          (2006.01)
(Continued)

(52) U.S. Cl.
CPC ........... *H04W 68/02* (2013.01); *H04L 5/0091* (2013.01); *H04W 56/0015* (2013.01); *H04W 68/005* (2013.01)

(58) Field of Classification Search
CPC ............... H04W 68/02; H04W 68/005; H04W 56/0015; H04L 5/0091
See application file for complete search history.

(56) References Cited

U.S. PATENT DOCUMENTS 12,323,904 B2 *   6/2025   Agiwal ................. H04W 68/02
2010/0323693 A1 *  12/2010  Krishnamurthy .... H04J 11/0093
                                                    455/434
(Continued)

FOREIGN PATENT DOCUMENTS

CN          101043718 A      9/2007
CN          101060713 A      10/2007
(Continued)

OTHER PUBLICATIONS

First Office Action for Chinese Application No. 202011043669.0, dated Apr. 20, 2023, 6 Pages.
(Continued)

*Primary Examiner* — Khai M Nguyen
(74) *Attorney, Agent, or Firm* — BROOKS KUSHMAN P.C.

(57) ABSTRACT

A channel detection method and apparatus, a device and a user equipment are disclosed. The method includes: receiving, by a UE, a paging indication signal transmitted by a network device, where the paging indication signal is used for instructing the UE whether to detect a paging downlink control channel in K POs, the K POs are K POs after the paging indication signal is received, and K is a positive integer.

20 Claims, 5 Drawing Sheets

(51) Int. Cl.
    *H04W 56/00*     (2009.01)
    *H04W 68/02*     (2009.01)

(56)           References Cited

U.S. PATENT DOCUMENTS

| | | | |
|---|---|---|---|
| 2017/0244529 A1 | 8/2017 | Yu et al. | |
| 2020/0107294 A1* | 4/2020 | Ji | H04W 68/005 |
| 2021/0168759 A1* | 6/2021 | Pan | H04W 68/02 |
| 2024/0163813 A1* | 5/2024 | Zou | H04W 52/241 |

FOREIGN PATENT DOCUMENTS

| | | | |
|---|---|---|---|
| CN | 105766013 A | 7/2016 | |
| CN | 109286966 A | 1/2019 | |
| CN | 110710285 A | 1/2020 | |
| CN | 110831125 A | 2/2020 | |
| EP | 3991496 B1 * | 9/2023 | H04L 5/0053 |
| WO | 2016070429 A1 | 5/2016 | |
| WO | 2018144873 A1 | 8/2018 | |
| WO | WO-2018174612 A1 * | 9/2018 | H04W 72/23 |
| WO | 2018218687 A1 | 12/2018 | |
| WO | 2019141123 A1 | 7/2019 | |
| WO | 2019217697 A1 | 11/2019 | |

OTHER PUBLICATIONS

International Search Report and Written Opinion for Application No. PCT/CN2021/120647, dated Jan. 4, 2022, 6 Pages.

Extended European Search Report for Application No. 21871637.1, dated Feb. 20, 2024, 12 Pages.

3GPP "3rd Generation Partnership Project; Technical Specification Group Radio Access Network; NR; Medium Access Control (MAC) protocol specification (Release 15)" 3GPP TS 38.321 V15.2.0 (Jun. 2018), 2018, 73 Pages.

First Office Action for Japanese Application No. 2023-519518, dated Feb. 21, 2024, 3 Pages.

MediaTek Inc. "Paging Enhancements for UE Power Saving in NR" 3GPP TSG-RAN WG2 Meeting #111 electronic, Online, Aug. 2020, R2-2008361, 8 Pages.

* cited by examiner

12

Network device 11 11

UE

UE

---

| A UE receives a paging indication signal transmitted by a network device | 201 |

First paging downlink control
channel monitoring occasion

First paging
indication signal

First SSB

SSB

Paging
indication
signal

Paging downlink
control channel

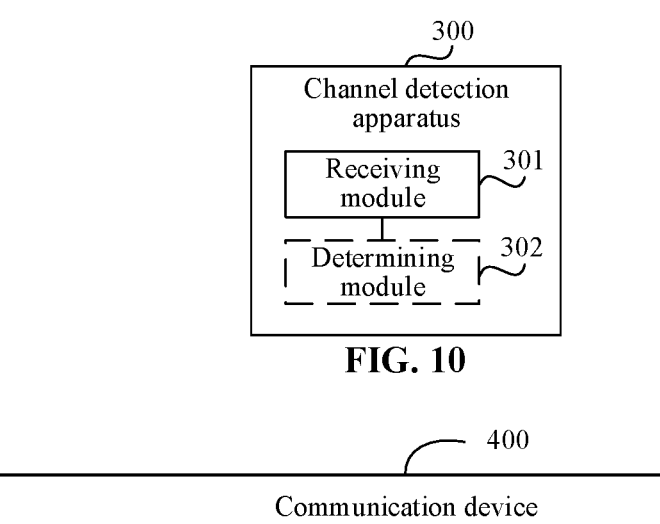
FIG. 10
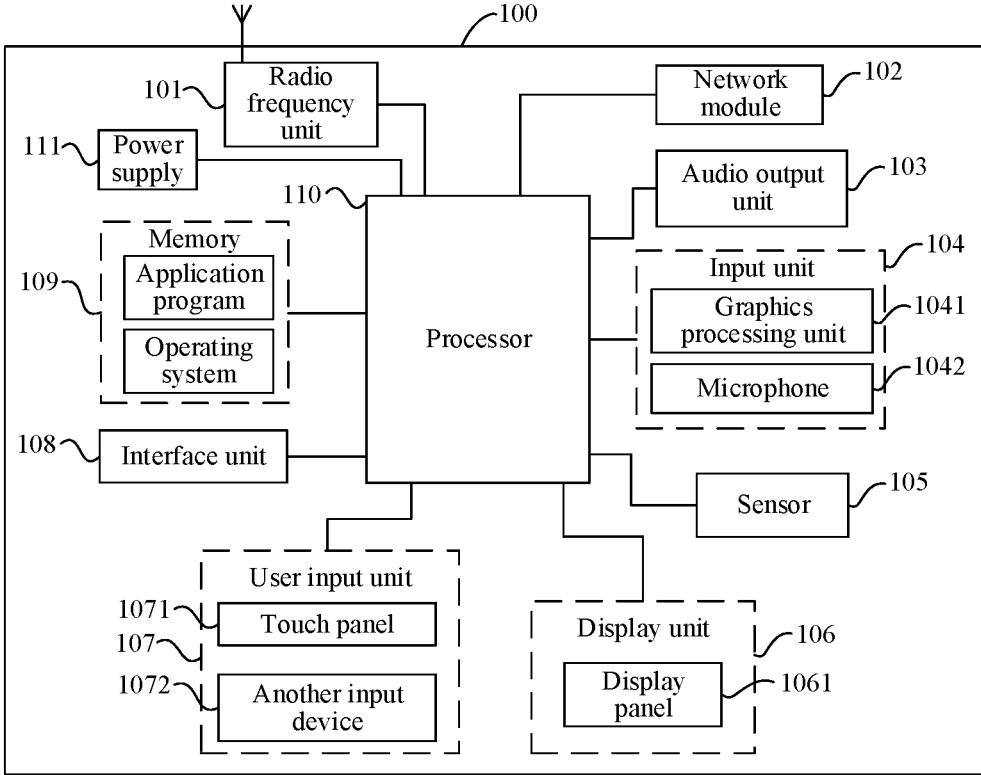
FIG. 11
FIG. 12

CHANNEL DETECTION METHOD AND APPARATUS, AND USER EQUIPMENT

CROSS-REFERENCE TO RELATED APPLICATIONS

This application is a continuation of PCT International Application No. PCT/CN2021/120647 filed on Sep. 26, 2021, which claims priority to Chinese Patent Application No. 202011043669.0 filed on Sep. 28, 2020, which are incorporated herein by reference in their entireties.

TECHNICAL FIELD

This application relates to the field of communications technologies, and specifically, to a channel detection method and apparatus, and a user equipment.

BACKGROUND

A user equipment (UE) in an idle state can receive a paging physical downlink control channel (PDCCH). The paging PDCCH can be used for paging a UE, transmitting a commercial mobile alert service (CMAS), transmitting an earthquake and tsunami warning system (ETWS), and the like.

However, a probability that the UE is paged in one paging occasion (PO) is relatively low. Therefore, if the UE periodically detects (or may be referred to as monitoring) the paging PDCCH, it is highly probable that the UE cannot detect the paging PDCCH, causing unnecessary paging PDCCH detection of the UE, thereby wasting power of the UE.

SUMMARY

According to a first aspect, a channel detection method is provided, including: receiving, by a UE, a paging indication signal transmitted by a network device, where the paging indication signal is used for instructing the UE whether to detect a paging downlink control channel in K POs, the K POs are K POs after the paging indication signal is received, and K is a positive integer.

According to a second aspect, a channel detection apparatus is provided, including a receiving module. The receiving module is configured to receive a paging indication signal transmitted by a network device, where the paging indication signal is used for instructing a UE whether to detect a paging downlink control channel in K POs, the K POs are K POs after the paging indication signal is received, and K is a positive integer.

According to a third aspect, a UE is provided, including a processor, a memory, and a program or instruction stored on the memory and runnable on the processor, where when the program or instruction is executed by the processor, the steps of the method according to the first aspect are implemented.

According to a fourth aspect, a readable storage medium is provided, storing a program or instruction, where when the program or instruction is executed by a processor, the steps of the method according to the first aspect are implemented.

According to a fifth aspect, a chip is provided, including a processor and a communication interface, where the communication interface is coupled to the processor, and the processor is configured to run a network device program or instruction to implement the steps of the method according to the first aspect.

BRIEF DESCRIPTION OF THE DRAWINGS

FIG. 10 is a schematic structural diagram of a channel detection apparatus according to an embodiment of this application;

FIG. 11 is a schematic structural diagram of a communication device according to an embodiment of this application; and FIG. 12 is a schematic diagram of hardware of a UE according to an embodiment of this application.

DETAILED DESCRIPTION

The following clearly describes the technical solutions in embodiments of this application with reference to the accompanying drawings in the embodiments of this application. Apparently, the described embodiments are some of the embodiments of this application rather than all of the embodiments. All other embodiments derived by a person of ordinary skill in the art based on the embodiments of this application without creative efforts shall fall within the protection scope of this application.

In the specification and claims of this application, the terms "first", "second", and the like are used to distinguish similar objects, but are not used to describe a specific sequence or order. It may be understood that the terms used in such a way is interchangeable in proper circumstances, so that the embodiments of this application described herein can be implemented in other sequences than the sequence illustrated or described herein, and the objects distinguished through "first" and "second" are generally of a same type and the number of the objects are not limited, for example, a first object may be one or more than one. In addition, "and/or" in this specification and the claims represents at least one of the connected objects, and a character "/" used herein indicates an "or" relationship between associated objects.

It is to be noted that the technologies described in the embodiments of this application are not limited to a long term evolution (LTE)/LTE-advanced (LTE-A) system, and may be further applied to other wireless communication systems such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are often used interchangeably, and the technology described can be applied to the systems and radio technologies mentioned above, and can also be applied to other systems and radio technologies. However, the following exemplarily describes a new radio (NR) system, and NR terms are used in most of the descriptions below. These technologies can also be applied to applications other than the NR system, for example, the $6^{th}$ generation (6G) communication system.

Figures 1, 2, 3:
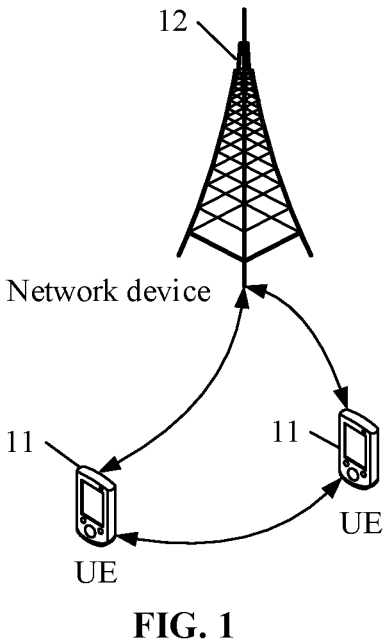
FIG. 1 is a schematic architectural diagram of a communication system according to an embodiment of this application.
FIG. 2 is a schematic flowchart of a channel detection method according to an embodiment of this application.
FIG. 3 is a schematic mapping diagram 1 of a paging indication signal according to an embodiment of this application.

FIG. 1 shows a block diagram of a wireless communication system to which an embodiment of this application is applicable. The wireless communication system includes a UE 11 and a network device 12. The UE 11 may also be referred to as a UE device or a user equipment (UE), and the UE 11 may be a UE side device, such as a mobile phone, a tablet personal computer, a laptop computer also referred to as a notebook computer, a personal digital assistant (PDA), a handheld computer, a netbook, an ultra-mobile personal computer (UMPC), a mobile Internet device (MID), a wearable device, a vehicle user equipment (VUE), or a pedestrian UE (PUE). The wearable device includes: a hand ring, a headset, a pair of glasses, or the like. It is to be noted that, a specific type of the UE 11 is not limited in the embodiments of this application. The network device 12 may be a base station or a core network, where the base station may be referred to as a node B, an evolved node B, an access point, a base transceiver station (BTS), a radio base station, a radio transceiver, a basic service set (BBS), an extended service set (ESS), a home node B, a home evolved node B, a WLAN access point, a WiFi node, a transmitting receiving point (TRP), or another proper term in the field as long as reaching the same technical effect. The base station is not limited to a specific technical word. It is to be noted that, only a base station in an NR system is taken as an example in this embodiment of this application, but a specific type of the base station is not limited.

A channel detection method according to the embodiments of this application is described in detail below with reference to the accompanying drawings through specific embodiments and application scenarios thereof.

As shown in FIG. 2, an embodiment of this application provides a channel detection method, and the method may include the following step 201.

It is to be noted that, the channel detection method provided in this embodiment of this application may be performed by a channel detection apparatus, a control module configured to perform the channel detection method in the channel detection apparatus, or a device (for example, the UE in the embodiments of this application) including the channel detection apparatus. In an embodiment of this application, that the UE performs the channel detection method is taken as an example for description of the channel detection apparatus according to this embodiment of this application.

Step 201: The UE receives a paging indication signal transmitted by a network device.

The foregoing paging indication signal may be used for instructing the UE whether to detect a paging downlink control channel in K paging occasions, the K POs may be K POs after the UE receives the paging indication signal, and K is a positive integer.

In this embodiment of this application, the network device may transmit the paging indication signal to the UE so as to instruct the UE whether to detect the paging downlink control channel in the foregoing K POs. In this way, after the UE receives the paging indication signal, the UE may determine whether to detect the paging downlink control channel in the K POs according to the paging indication signal.

Optionally, in this embodiment of this application, the paging indication signal may be a downlink control channel (for example, a PDCCH), or a signal sequence. Details may be determined according to an actual use requirement, which is not limited in this embodiment of this application.

It is to be noted that, the examples in this embodiment of this application are all exemplarily described by using an example that the downlink control channel is the PDCCH, but the downlink control channel may further be any other possible channel during actual implementation.

Optionally, in this embodiment of this application, the channel detection method provided in this embodiment of this application may further include the following step 202. The foregoing step 201 may be specifically implemented through the following step 201*a*.

Step 202: The UE determines a first transmission resource of the paging indication signal according to first information.

Step 201*a*: The UE receives the paging indication signal transmitted by the network device on the first transmission resource.

The foregoing first information may include at least one of the following:

an index of a synchronization signal and physical broadcast channel block (SSB) associated with the paging indication signal;

a paging downlink control channel monitoring occasion (MO) in a PO; or a UE group in which the UE is located.

In this embodiment of this application, before the UE receives the foregoing paging indication signal, the UE may determine a transmission resource (that is, the foregoing first transmission resource) of the paging indication signal transmitted by the network device according to the foregoing first information, and then the UE may directly receive the paging indication signal on the first transmission resource.

It is to be noted that, in this embodiment of this application, a paging downlink control channel monitoring occasion in one PO is associated with an SSB transmitted by the network device, for example, N paging PDCCH monitoring occasions in the PO correspond one-to-one to N SSBs transmitted by the network device based on a time sequence. Therefore, in a case that the UE determines a paging downlink control channel monitoring occasion in a PO, the UE may determine an associated SSB according to the paging downlink control channel monitoring occasion in the PO.

The N SSBs may be N SSBs configured by the network device through high layer signaling.

Exemplarily, assuming that the network device configures a transmission of the N SSBs, each PO includes N paging PDCCH MOs, the N paging PDCCH MOs are associated with the N SSBs based on a time sequence according to indexes of the SSBs from small to large; and then the first paging PDCCH MO in the PO corresponds to an SSB (that is, the first SSB in ascending order) with a smallest index transmitted by the network device, and the last paging PDCCH MO in the PO corresponds to an SSB with a largest index transmitted by the network device.

Optionally, in this embodiment of this application, for the foregoing N SSBs and each downlink control channel monitoring occasion in the PO corresponding to each SSB, an $n^{th}$ ($1 \leq n \leq N$) SSB and an $n^{th}$ downlink control channel monitoring occasion corresponding to the $n^{th}$ SSB satisfy a third quasi co-located (QCL) relationship.

A QCL type of the foregoing third QCL may include at least one of the following:

CL-type A: {Doppler shift, Doppler spread, average delay, delay spread};

QCL-type B: {Doppler shift, Doppler spread};

QCL-type C: {average delay, Doppler shift}; or

QCL-type D: {Spatial Rx parameter}.

In this embodiment of this application, the foregoing first information is different, and a manner for the UE to determine the foregoing first transmission resource may be different. The first information may include three possible cases: the following case 1, case 2, and case 3 respectively.

Case 1: The first information includes the index of the SSB associated with the paging indication signal.

Case 2: The first information includes the paging downlink control channel monitoring occasion in the PO.

Case 3: The first information includes the index of the SSB associated with the paging indication signal and the UE group in which the UE is located.

It is to be noted that, during actual implementation, the first information may further include any other possible case. Details may be determined according to an actual use requirement, which is not limited in this embodiment of this application.

The manner for the UE to determine the first transmission resource is exemplarily described below based on the foregoing case 1, case 2, and case 3 respectively.

Optionally, based on the foregoing case 1 (the first information includes the index of the SSB associated with the paging indication signal), the foregoing step 202 may be specifically implemented through the following step 202*a*.

Step 202*a*: The UE determines the first transmission resource of the paging indication signal according to an SSB index order on a second transmission resource based on an association sequence.

The foregoing second transmission resource may include a transmission resource of at least one paging indication signal; the foregoing SSB index order may be an order of the index of the SSB associated with the paging indication signal; and the foregoing association sequence may be an association sequence of the SSB associated with the paging indication signal and the second transmission resource, which may also be referred to as a first association sequence.

It is to be noted that, in addition to special description, association sequences involved in this embodiment of this application all refer to the association sequence of the SSB associated with the paging indication signal and the second transmission resource, that is, the foregoing first association sequence.

In this embodiment of this application, the network device may configure a transmission resource of one or more paging indication signals on a time domain resource and/or a frequency domain resource. The transmission resource of one or more paging indication signals may be a transmission resource in the second transmission resource, that is, the second transmission resource may include the transmission resource of one or more paging indication signals.

Optionally, in this embodiment of this application, the foregoing second transmission resource may include at least one of the following:

a transmission resource including all or a part of transmission symbols of the SSB;

a transmission resource having an offset of a preset time interval in time domain from a transmission resource of the SSB; or a transmission resource associated with the transmission resource of the SSB based on the association sequence.

It is to be noted that, in this embodiment of this application, the foregoing SSB may be the SSB associated with the paging indication signal.

Optionally, in this embodiment of this application, in a case that the foregoing second transmission resource includes the transmission resource having the offset of the preset time interval in time domain from the transmission resource of the SSB, if the second transmission resource includes transmission resources of a plurality of paging indication signals, time offsets (that is the preset time intervals) of SSBs associated with the plurality of paging indication signals may be the same or different. Details may be determined according to an actual use requirement, which is not limited in this embodiment of this application.

The foregoing second transmission resource may include at least one of the following: a transmission resource shifted forward on the transmission resource of the SSB, or a transmission resource shifted backward on the transmission resource of the SSB.

Optionally, in this embodiment of this application, the foregoing association sequence may include at least one of the following: a time sequence, a frequency sequence, a time-preceding-frequency sequence, or a frequency-preceding-time sequence.

It may be understood that the foregoing transmission resource associated with the transmission resource of the SSB based on the association sequence may include at least one of the following: a transmission resource associated with the transmission resource of the SSB based on the time sequence, a transmission resource associated with the transmission resource of the SSB based on the frequency sequence, a transmission resource associated with the transmission resource of the SSB based on the time-preceding-frequency sequence, or a transmission resource associated with the transmission resource of the SSB based on the frequency-preceding-time sequence.

In this embodiment of this application, the network device may map the paging indication signal on the second transmission resource according to the order of the index of the SSB associated with the paging indication signal (the foregoing SSB index order) based on an association sequence of the SSB associated with the paging indication signal and the second transmission resource (the first association sequence). In this way, the UE may determine the first transmission resource of the paging indication signal transmitted by the network device according to the manner of mapping the paging indication signal on the second transmission resource by the network device.

The manner of mapping the paging indication signal by the network device is exemplarily described below by using the following examples 1 to 5.

Example 1: the foregoing second transmission resource includes the transmission resource associated with the transmission resource of the SSB based on the association sequence, and the association sequence includes the time sequence. Then, as shown in FIG. 3, the first transmission occasion of the paging indication signal corresponds to a transmission occasion corresponding to a transmission occasion of the SSB with a smallest (lowest) index value transmitted by the network device, that is, the first transmission occasion of the paging indication signal corresponds to the transmission occasion corresponding to the transmission occasion of the SSB with the first index value ranked in ascending order transmitted by the network device.

Example 2: the foregoing second transmission resource includes the transmission resource having the offset of the preset time interval in time domain from the transmission resource of the SSB, the preset time interval is x symbols, and the foregoing association sequence is the time sequence. Then, as shown in FIG. 4, the first transmission occasion of the paging indication signal corresponds to a transmission occasion obtained after the transmission occasion of the SSB with the smallest (lowest) index value transmitted by the network device is shifted backward by x symbols.

Figures 4, 5:
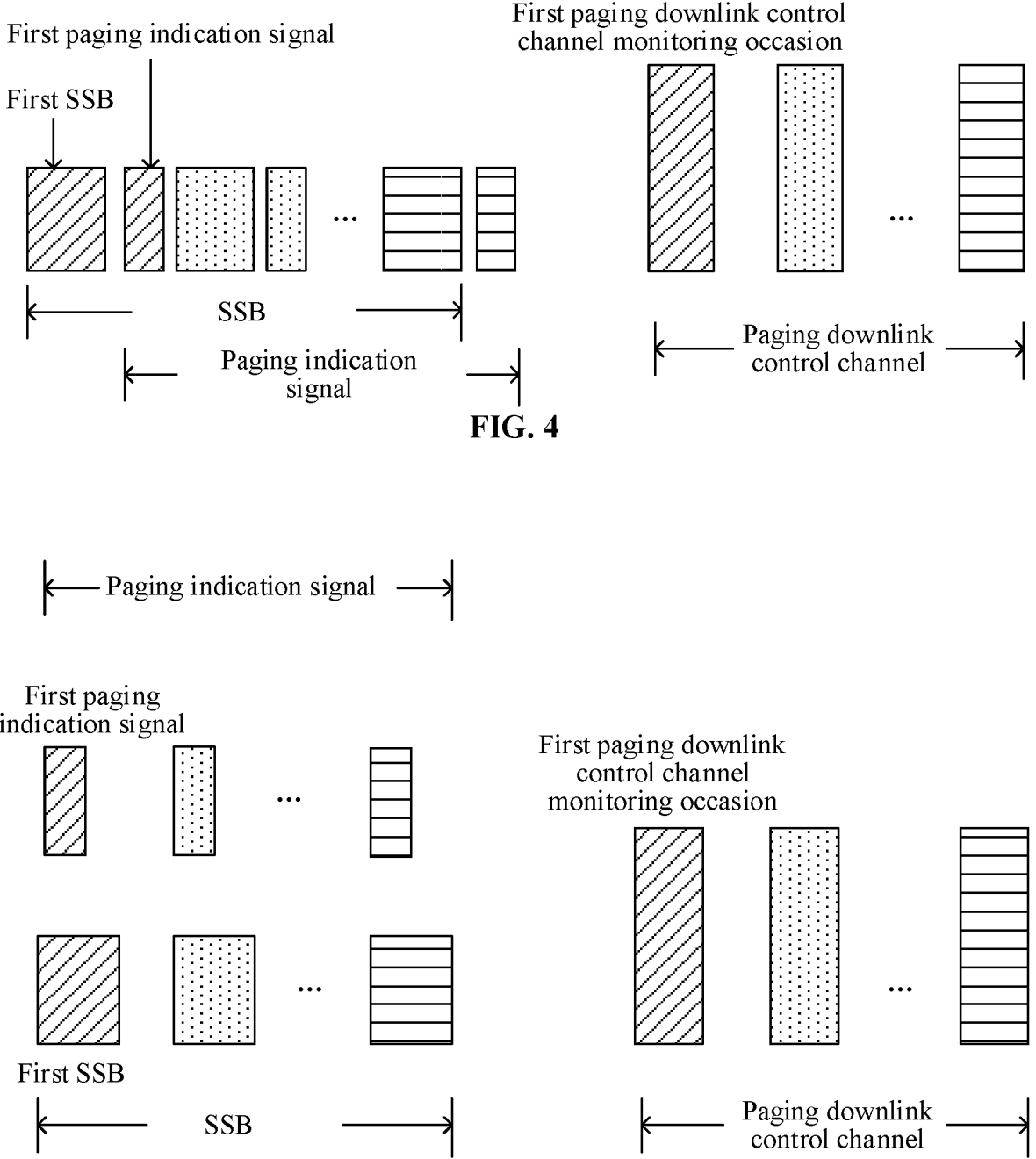
FIG. 4 is a schematic mapping diagram 2 of a paging indication signal according to an embodiment of this application.
FIG. 5 is a schematic mapping diagram 3 of a paging indication signal according to an embodiment of this application.

Example 3: as shown in FIG. 5, the foregoing second transmission resource includes "a transmission resource including a part of transmission symbols of the SSB", and the foregoing association sequence is the time sequence. Then, the UE may complete reception of the paging indication signal during receiving the SSB.

Figure 6:
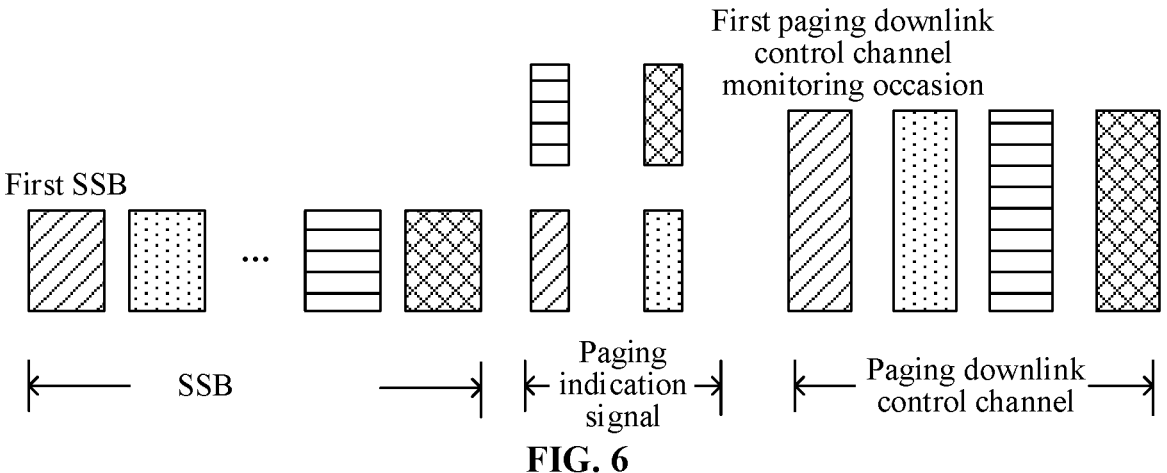
FIG. 6 is a schematic mapping diagram 4 of a paging indication signal according to an embodiment of this application.

Example 4: in a case that the foregoing second transmission resource includes a transmission resource of a plurality of paging indication signals configured by the network device at a plurality of frequency locations and time locations, the association sequence may be the frequency-preceding-time sequence, that is, the network device maps the paging indication signals in the second transmission resource in a mapping manner according to the frequency-preceding-time sequence. As shown in FIG. 6, during a time period, time or frequency locations at which paging indication signals associated with different SSBs are transmitted are different, it is supported that two paging indication signals are transmitted in a frequency division multiplexing (FDM) manner on fluency. After sorting indexes of the SSBs in ascending order, a paging indication signal associated with a first SSB is transmitted at a first frequency location of a first moment, a paging indication signal associated with a second SSB is transmitted at a second frequency location of the first moment, a paging indication signal associated with a third SSB is transmitted at a first frequency location of a second moment, and a paging indication signal associated with a fourth SSB is transmitted at a second frequency location of the second moment, Optionally, in the foregoing example 4, paging indication signals transmitted at different frequency locations may correspond to different frequency offsets.

In addition, the paging indication signal in the example 4 may be a paging indication signal in a sequence form, that is, the paging indication signal is the signal sequence.

Figure 7:
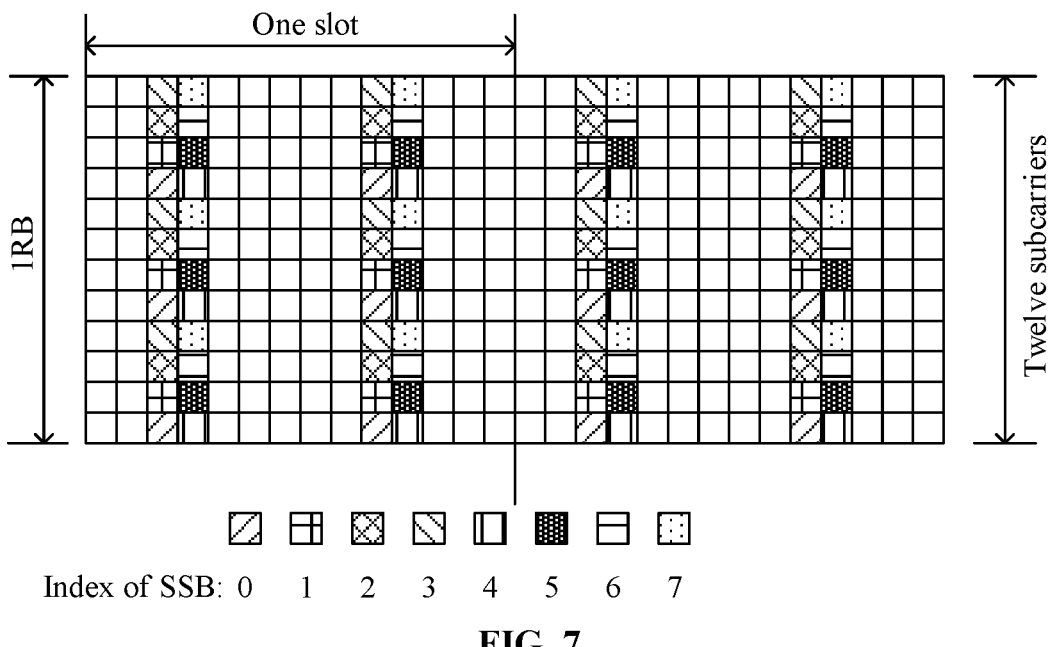
FIG. 7 is a schematic mapping diagram 5 of a paging indication signal according to an embodiment of this application.

Example 5: the paging indication signal is a discrete signal sequence, that is, the mapping of the paging indication signal is discontinuous on frequency or time, and frequency offsets corresponding to different frequency locations are different, or time offsets corresponding to different time locations are different. As shown in FIG. 7, for a mapping manner of a signal sequence of a paging indication signal in a slot, the signal sequence of the paging indication signals associated with X=4 SSBs is mapped on each symbol, the signal sequence (or may be referred to as a sequence) is mapped on at least one symbol, a frequency interval is Y=4 on each symbol, and initial resource elements (RE) on each resource block (RB) are different, that is, RE offsets are different, and the frequency offsets (values predefined or configured by the network device) are different. The network device may perform mapping based on the frequency-preceding-time sequence, paging indication signals associated with front P=4 SSBs are transmitted on symbol $k0 \in \{2, 9\}$, and paging indication signals associated with back $Q=8-4=4$ SSBs are transmitted on symbol $k1 \in \{3, 10\}$, that is, $k1=k0+\Delta k$, and $\Delta k$ is a time offset of a symbol. In this way, the UE may determine transmission resources of the paging indication signals from these symbols based on the frequency-preceding-time sequence.

It is to be noted that, in this embodiment of this application, magnitude of values of X, Y, Q, P, k0, and k1 in the example 5 is not limited to values shown in the example 5, and may be any other possible values, which may be predefined or configured by the network device.

In addition, FIG. 7 only shows a mapping manner of the paging indication signal in one RB in one slot, which may not be limited actually. During actual implementation, the paging indication signal may be transmitted on a plurality of RBs or slots. The plurality of RBs or slots may be continuous or may be discontinuous.

Optionally, in this embodiment of this application, the foregoing step 202*a* may be specifically implemented through the following step 202*a*1.

Step 202*a*1: The UE determines the first transmission resource according the SSB index order on a preset time domain resource in the second transmission resource based on the association sequence.

The preset time domain resource may include at least one of the following: a downlink slot, a special slot, a downlink symbol, or a flexible symbol.

In this embodiment of this application, the foregoing special slot may be a slot including at least two symbols of the downlink symbol, an uplink symbol, or the flexible symbol.

Optionally, in this embodiment of this application, the paging indication signal (for example, the signal sequence of the paging indication signal) may be transmitted on a plurality of symbols, so that the UE may perform frequency offset estimation and compensation according to the plurality of symbols.

Optionally, the paging indication signal may be repeatedly transmitted on the plurality of symbols.

Figure 8:
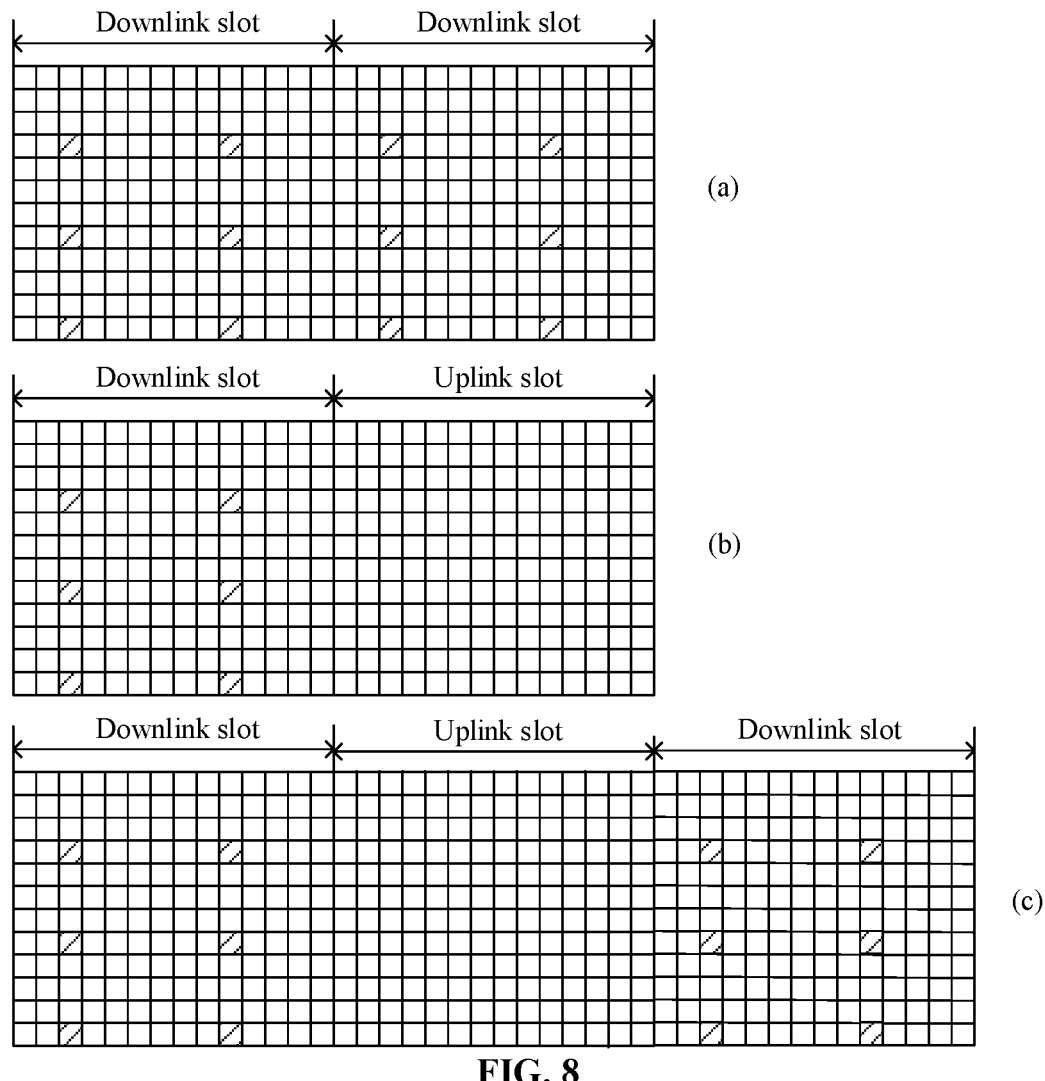
FIG. 8 is a schematic mapping diagram 6 of a paging indication signal according to an embodiment of this application.

Exemplarily, assuming that the network device only transmits the paging indication signal on downlink symbols, for example, the paging indication signal is configured to be repeatedly transmitted on the plurality of slots, and then after the UE determines the plurality of slots as shown in FIG. 8 (*a*), the UE may repeatedly receive the paging indication signal on the plurality of slots. If there are non-downlink symbols or non-downlink slots in the second transmission resource, the UE does not receive the paging indication signal on these non-downlink symbols or non-downlink slots, that is, as shown in FIG. 8 (*b*), the UE does not receive a remaining paging indication signal; or as shown in FIG. 8 (*c*), the UE delays receiving the remaining paging indication signal.

Optionally, based on the foregoing case 2 (the first information includes the paging downlink control channel monitoring occasion in the PO), the UE may determine the SSB associated with the paging indication signal according to the paging downlink control channel monitoring occasion in the PO, and then determine the foregoing first transmission resource according to the index of the SSB associated with the paging indication signal.

It is to be noted that, for a manner of determining the first transmission resource according to the index of the SSB associated with the paging indication signal, reference may be made to detailed descriptions of the foregoing embodiment. Details are not described herein again to avoid repetition.

Optionally, based on the foregoing case 3 (the first information includes the index of the SSB associated with the paging indication signal and the UE group in which the UE is located), the network device may map the paging indication signal on the second transmission resource according to the order of the index of the SSB associated with the paging indication signal (that is the foregoing SSB index order) based on the association sequence of the SSB associated with the paging indication signal and the foregoing second transmission resource (that is the foregoing first association sequence) and a second association sequence of the paging indication signal and the UE group in which the UE is located, so that the UE may determine the first transmission resource according to the SSB index order based on the first association sequence and the second association sequence.

Optionally, in this embodiment of this application, the network device may first map the paging indication signal on the second transmission resource based on the first association sequence, and then map the paging indication signal on the second transmission resource based on the second association sequence; or the network device may first map the paging indication signal on the second transmission resource based on the second association sequence, and then map the paging indication signal on the second transmission resource based on the first association sequence. Details may be determined according to an actual use requirement, which is not limited in this embodiment of this application.

Figure 9:
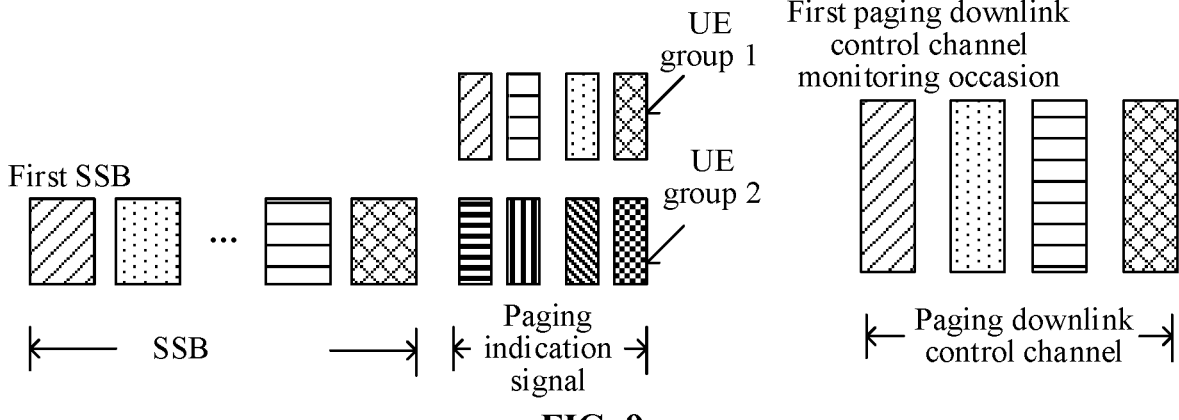
FIG. 9 is a schematic mapping diagram 7 of a paging indication signal according to an embodiment of this application.

Exemplarily, as shown in FIG. 9, UEs are divided into G=2 UE groups according to UE-IDs. When Z=8 transmission resources are configured in the network device, a resource quantity of the paging indication signal associated with each SSB is G=2. The UEs may first determine a transmission resource of paging indication signals of all UE groups associated with one SSB, and then sequentially determine a transmission resource of paging indication signals of UE groups associated with a remaining SSB; or the UEs may first determine a transmission resource of paging indication signals of all SSBs associated with one UE group, and then sequentially determine a transmission resource of paging indication signals of all SSBs associated with a remaining UE group, so as to determine the foregoing first transmission resource.

In this embodiment of this application, because both the paging indication signal and the paging downlink control channel are associated with the SSB, the paging indication signal is also associated with the paging downlink control channel. In this way, after the first transmission resource of the paging indication signal is determined, the UE may determine a fourth transmission resource of the paging downlink control channel according to the first transmission resource of the paging indication signal.

In this embodiment of this application, as shown in FIG. 3 to FIG. 6, or FIG. 8, the foregoing fourth transmission resource may be located behind the foregoing first transmission resource on time.

Optionally, in this embodiment of this application, after the UE determines the foregoing first transmission resource, the UE may receive the paging indication signal transmitted by the network device on the first transmission resource according to a QCL relationship (for example, a first QCL relationship in this embodiment of this application) satisfied between the paging indication signal and the SSB associated with the paging indication signal.

Optionally, in this embodiment of this application, based on the foregoing step 202 or step 202a, the foregoing step 201a may be specifically implemented through the following step 201a1.

Step 201a1: The UE receives the paging indication signal transmitted by the network device on the first transmission resource based on the first QCL relationship.

The foregoing first QCL relationship may be the QCL relationship between the paging indication signal and the SSB associated with the paging indication signal. That is to say, the first QCL relationship is satisfied between the paging indication signal and the SSB associated with the paging indication signal.

Optionally, in this embodiment of this application, the foregoing first QCL relationship may include at least one of the following:

a Doppler shift, a Doppler spread, an average delay, a delay spread, a Spatial Rx parameter, or an Average gain.

Optionally, in this embodiment of this application, in a case that the foregoing paging indication signal is a signal sequence, the signal sequence may occupy one or more orthogonal frequency division multiplex (OFDM) symbols.

In this embodiment of this application, if the paging indication signal (that is the foregoing signal sequence) occupies a plurality of symbols, the paging indication signal associated with a same SSB on the plurality of symbols also satisfies the foregoing first QCL relationship.

Optionally, in this embodiment of this application, the foregoing plurality of symbols may be neighboring symbols or non-neighboring symbols. When the plurality of symbols are non-neighboring symbols, a time interval between the plurality of symbols may be configured by the network device.

Optionally, in this embodiment of this application, in a case that the signal sequence of the paging indication signal occupies a plurality of OFDM symbols, the foregoing step 201a may be specifically implemented through the following step 201a2.

Step 201a2: The UE receives the signal sequence of the paging indication signal on the first transmission resource according to second information.

The second information may include at least one of the following: a generation manner for the signal sequence of the paging indication signal or a second QCL relationship. The generation manner for the signal sequence may be a manner for the network device to generate the signal sequence, and the second QCL relationship may be a QCL relationship between a plurality of signal sequences transmitted on the foregoing plurality of OFDM symbols, that is, the plurality of signal sequences transmitted on the plurality of OFDM symbols satisfy the second QCL relationship.

It is to be noted that, that the plurality of signal sequences transmitted on the plurality of OFDM symbols satisfy the second QCL relationship may be understood as that the plurality of signal sequences are transmitted on the plurality of OFDM symbols through a same antenna port.

Optionally, in a possible implementation, the signal sequence of the paging indication signal may be a gold sequence, an m sequence, a zc sequence, a predefined sequence, or any other possible sequence.

Optionally, in another possible implementation, the signal sequence of the paging indication signal may be a sequence obtained through multiplying a plurality of sequences among the gold sequence, the m sequence, the zc sequence, or the predefined sequence.

Certainly, during actual implementation, the signal sequence of the paging indication signal may further be any other possible sequence. Details may be determined according to an actual use requirement, which is not limited in this embodiment of this application.

Optionally, in this embodiment of this application, in a case that the foregoing second information includes the generation manner for the signal sequence, before the foregoing step 201a2, the channel detection method provided in this embodiment of this application may further include the following step 203.

Step 203: The UE determines the generation manner for the signal sequence according to third information.

The foregoing third information may include at least one of the following:

an index of a system frame number (SFN) in which the signal sequence (that is the signal sequence of the paging indication signal) is located;

an index of a slot in which the signal sequence is located;

an index of a symbol in which the signal sequence is located;

an index of an SSB associated with the signal sequence;

an instruction by the signal sequence of whether to detect a paging downlink control channel;

an index of a UE group detecting a paging downlink control channel;

an index of a first transmission resource transmitting the signal sequence;

a number of a cell on which the UE camps; or a number of a cell to which the network device transmits the paging indication signal.

In this embodiment of this application, in a case that the foregoing second information includes the generation manner for the signal sequence, the UE may first determine the generation manner for the signal sequence according to the foregoing third information, so as to receive the signal sequence of the paging indication signal on the first transmission resource according to the second information.

Exemplarily, taking that the signal sequence of the paging indication signal is a gold sequence as an example, an initialization formula of the gold sequence may be:

$$C_{init} = 2^6 \left( N_{symb}^{slot} n_{s,f}^{\mu} + l + 1 \right) (2i_{ssb} + 1) + n_{ID}$$

where $$N_{symb}^{slot}$$

represents a symbol quantity in one slot, $$n_{s,f}^{\mu}$$

is a symbol index, and $i_{ssb}$ is an index of an associated SSB.

In an implementation, $n_{ID}$ is used for indicating whether the UE needs to monitor a paging downlink control channel in a PO (that is, whether to detect the paging downlink control channel in the PO). $n_{ID}=0$ represents skipping monitoring the paging downlink control channel; and $n_{ID}=1$ represents monitoring the paging downlink control channel. Or, $n_{ID}$ is used for indicating the index of the UE group monitoring (detecting) the paging downlink control channel.

Optionally, in this embodiment of this application, after the UE determines the foregoing first transmission resource, the UE may determine whether the first transmission resource conflicts (intersects or overlaps in time domain) with a transmission resource (for example, a third transmission resource in this embodiment of this application) for performing another event (for example, a first event in this embodiment of this application). If the first transmission resource overlaps with the third transmission resource for performing the first event in time domain, one of the following step 201a3 and step 204 is selected to be performed.

Step 201a3: The UE receives the paging indication signal on the first transmission resource in a case that the first transmission resource overlaps with the third transmission resource for performing the first event in time domain.

Optionally, in this embodiment of this application, in a case that N (a positive integer) transmission occasions in the foregoing first transmission resource overlaps with the foregoing third transmission resource in time domain, if N is less than a second threshold, the UE receives the paging indication signal on the first transmission resource.

Correspondingly, when N is greater than or equal to the foregoing second threshold, the UE may not receive the paging indication signal. For example, the UE may perform the first event on the third transmission resource.

Optionally, in this embodiment of this application, the foregoing N transmission occasions may be N transmission symbols.

Step 204: The UE performs the first event on the third transmission resource in a case that the first transmission resource overlaps with the third transmission resource for performing the first event in time domain.

It may be understood that, because it is one of the foregoing step 201a3 and step 204 that is selected to be performed, if the UE selects to perform the step 201a3, then the UE will not perform the step 204, or if the UE selects to perform the step 204, then the UE will not perform the step 201a3.

Optionally, in this embodiment of this application, in a case that the UE selects to perform the step 204, after the UE performs the foregoing first event, the UE may detects the paging downlink control channel in the foregoing K POs; or the UE may not detect the paging downlink control channel in the K POs. Details may be determined according to an actual use requirement, which is not limited in this embodiment of this application.

Optionally, in this embodiment of this application, the foregoing first event may include at least one of the following:

transmitting a random access channel, transmitting an MSG3, transmitting a hybrid automatic repeat request acknowledgement (HARQ-ACK) of an MSG4, receiving a random access response (RAR), receiving an MSGB, receiving a downlink shared channel of an MSG4, receiving a random access radio network temporary identifier (RA-RNTI), receiving a downlink control channel scrambled by a temporary cell RNTI (TC-RNTI), receiving an SSB, receiving a channel state information reference signal (CSI-RS), or receiving a tracking reference signal (TRS).

Optionally, in this embodiment of this application, before the foregoing step 201, the channel detection method provided in this embodiment of this application may further include the following step 205. The foregoing step 201 may be specifically implemented through the following step 201*b*.

Step 205: The UE determines a second power of the paging indication signal according to a first power.

The foregoing first power may be a power of an SSB associated with the paging indication signal or a power of a paging downlink control channel associated with the paging indication signal.

Step 201*b*: The UE receives the paging indication signal transmitted by the network device according to the second power.

In this embodiment of this application, before the UE receives the paging indication signal transmitted by the network device, the UE may determine the second power of the paging indication signal according to the power of the SSB associated with the paging indication signal or the power of the paging downlink control channel associated with the paging indication signal (the foregoing first power), so that the UE may receive the paging indication signal transmitted by the network device according to the second power of the paging indication signal.

Optionally, in this embodiment of this application, the foregoing second power may be the same as the first power; or a difference between the second power and the first power may be less than a first threshold; or the difference between the second power and the first power may be a predefined value (a value specified in a protocol) or a value indicated by the network device.

It is to be noted that, in this embodiment of this application, the foregoing "a difference between the second power and the first power may be less than a first threshold" may be understood as that the difference between the second power and the first power is within a preset range, for example, [−x, +x] dB.

Optionally, in this embodiment of this application, for the paging indication signal and the SSB associated with the paging indication signal or the paging downlink control channel associated with the paging indication signal, energy per resource (energy Per RE, EPRE) may be the same or a difference between EPREs is within a preset range.

Optionally, in this embodiment of this application, after the UE determines the foregoing second power of the paging indication signal, the UE may perform a second event based on the second power of the paging indication signal.

The second event may include at least one of measurement of radio resource management (RRM), an automatic gain control (AGC) operation performed before the paging downlink control channel is monitored, or time-frequency synchronization.

Optionally, in this embodiment of this application, after the UE receives the foregoing paging indication signal, the UE may determine whether to detect the paging downlink control channel in the foregoing K POs according to the paging indication signal. If the paging indication signal indicates the UE to detect the paging downlink control channel in the K POs, the UE may detect the paging downlink control channel according to the foregoing second power, that is, the UE receives the paging downlink control channel according to the second power.

According to the channel detection method provided in this embodiment of this application, the paging indication signal transmitted by the network device can indicate to the UE whether to detect a paging downlink control channel in the K POs after the paging indication signal is received. Therefore, the UE can determine whether to detect the paging downlink control channel according to the received paging indication signal. In this way, the UE can detect the paging downlink control channel in a PO indicated by the paging indication signal, so as to avoid unnecessary paging downlink control channel detection performed by the UE, thereby reducing the waste of power of the UE.

As shown in FIG. 10, an embodiment of this application provides a channel detection apparatus 300 including a receiving module 301. The receiving module 301 is configured to receive a paging indication signal transmitted by a network device, where the paging indication signal is used for instructing a UE whether to detect a paging downlink control channel in K POs, the K POs are K POs after the paging indication signal is received, and K is a positive integer.

Optionally, as shown in FIG. 10, the channel detection apparatus 300 may further include a determining module 302. The determining module 302 is configured to determine, before the receiving module 301 receives the paging indication signal transmitted by the network device, a first transmission resource of the paging indication signal according to first information. The receiving module 301 is specifically configured to receive the paging indication signal on the first transmission resource. The first information includes at least one of the following:

an index of an SSB associated with the paging indication signal;

a paging downlink control channel monitoring occasion in a PO; or a UE group in which the UE is located.

Optionally, the determining module 302 is specifically configured to determine the first transmission resource according to an SSB index order on a second transmission resource based on an association sequence, where the second transmission resource includes a transmission resource of at least one paging indication signal. The SSB index order is an order of the index of the SSB associated with the paging indication signal, and the association sequence is an association sequence of the SSB associated with the paging indication signal and the second transmission resource.

Optionally, the determining module 302 is specifically configured to determine the first transmission resource according to the SSB index order on a preset time domain resource in the second transmission resource based on the association sequence. The preset time domain resource includes at least one of the following: a downlink slot, a special slot, a downlink symbol, or a flexible symbol.

Optionally, the receiving module 301 is specifically configured to receive the paging indication signal on the first transmission resource based on a first QCL relationship. The first QCL relationship is a QCL relationship between the paging indication signal and the SSB associated with the paging indication signal.

Optionally, the second transmission resource includes at least one of the following:

a transmission resource including all or a part of transmission symbols of the SSB;

a transmission resource having an offset of a preset time interval in time domain from a transmission resource of the SSB; or a transmission resource associated with the transmission resource of the SSB based on the association sequence.

Optionally, the association sequence includes at least one of the following: a time sequence, a frequency sequence, a time-preceding-frequency sequence, or a frequency-preceding-time sequence.

Optionally, the paging indication signal is a signal sequence, and the signal sequence occupies one or more OFDM symbols.

Optionally, the signal sequence occupies a plurality of OFDM symbols; and the receiving module 301 is specifically configured to receive the signal sequence on the first transmission resource according to second information. The second information includes at least one of the following: a generation manner for the signal sequence or a second QCL relationship. The generation manner is a manner for the network device to generate the signal sequence, and the second QCL relationship is a QCL relationship between a plurality of signal sequences transmitted on the plurality of OFDM symbols.

Optionally, the second information includes the generation manner for the signal sequence; and the determining module 302 is further configured to determine, before the receiving module 301 receives the signal sequence on the first transmission resource according to the second information, the generation manner according to third information, where the third information includes at least one of the following:

an index of a SFN in which the signal sequence is located;

an index of a slot in which the signal sequence is located;

an index of a symbol in which the signal sequence is located;

an index of an SSB associated with the signal sequence;

an instruction by the signal sequence of whether to detect a paging downlink control channel;

an index of a UE group detecting a paging downlink control channel;

an index of a first transmission resource transmitting the signal sequence;

a number of a cell on which the UE camps; or a number of a cell to which the network device transmits the paging indication signal.

Optionally, the receiving module 301 is specifically configured to receive the paging indication signal on the first transmission resource in a case that the first transmission resource overlaps with a third transmission resource for performing a first event in time domain.

Optionally, N transmission occasions in the first transmission resource overlap with the third transmission resource in the time domain, and N is a positive integer; and the receiving module 301 is specifically configured to receive the paging indication signal on the first transmission resource in a case that N is less than a second threshold.

Optionally, the first event includes at least one of the following: transmitting a random access channel, transmitting an MSG3, transmitting an HARQ-ACK of an MSG4, receiving an RAR, receiving an MSGB, receiving a downlink shared channel of an MSG4, receiving an RA-RNTI, receiving a downlink control channel scrambled by a TC-RNTI, receiving an SSB, receiving a CSI-RS, or receiving a TRS.

Optionally, as shown in FIG. 10, the channel detection apparatus 300 may further include a determining module 302. The determining module 302 is configured to determine, before the receiving module 301 receives the paging indication signal transmitted by the network device, a second power of the paging indication signal according to a first power, where the first power is a power of an SSB associated with the paging indication signal or a power of a paging downlink control channel associated with the paging indication signal; and the receiving module 301 is specifically configured to receive the paging indication signal according to the second power.

Optionally, the second power is the same as the first power; or a difference between the second power and the first power is less than a first threshold; or the difference between the second power and the first power is a predefined value or a value indicated by the network device.

According to the channel detection apparatus provided in this embodiment of this application, the paging indication signal transmitted by the network device can indicate whether to detect a paging downlink control channel in the K POs after the paging indication signal is received. Therefore, whether to detect the paging downlink control channel can be determined according to the received paging indication signal. In this way, the UE can detect the paging downlink control channel in a PO indicated by the paging indication signal, so as to avoid unnecessary paging downlink control channel detection performed by the UE, thereby reducing the waste of power of the UE.

The channel detection apparatus in this embodiment of this application may be an apparatus, or may be a component, an integrated circuit, or a chip in a UE (or may be referred to as a terminal). The apparatus may be a mobile terminal or may be a non-mobile terminal. Exemplarily, the mobile terminal may include but is not limited to the category of the terminal 11 listed above. The non-mobile terminal may be a server, a network attached storage (NAS), a personal computer (PC), a television (TV), a teller machine, a self-service machine, or the like, which is not specifically limited in this embodiment of this application.

The channel detection apparatus in this embodiment of this application may be an apparatus with an operating system. The operating system may be an Android operating system, an ios operating system, or another possible operating system, which is not specifically limited in this embodiment of this application.

The channel detection apparatus provided in this embodiment of this application can implement all processes implemented by the foregoing method embodiments and the same technical effects can be achieved. Details are not described herein again to avoid repetition.

Optionally, as shown in FIG. 11, an embodiment of this application further provides a communication device 400, including a processor 401, a memory 402, and a program or instruction stored in the memory 402 and runnable on the processor 401. For example, when the communication device 400 is a UE, when the program or instruction is executed by the processor 401, each process of the foregoing channel detection method embodiments is implemented, and the same technical effects can be achieved. Details are not described herein again to avoid repetition.

FIG. 12 is a schematic diagram of a hardware structure of a UE for implementing the embodiments of this application.

A UE 100 includes, but is not limited to, components such as a radio frequency unit 101, a network module 102, an audio output unit 103, an input unit 104, a sensor 105, a display unit 106, a user input unit 107, an interface unit 108, a memory 109, and a processor 110.

A person skilled in the art may understand that the UE 100 may further include a power supply 111 (such as a battery) for supplying power to the components. The power supply 111 may be logically connected to the processor 110 by using a power management system, thereby implementing functions such as charging, discharging, and power consumption management by using the power management system. A UE structure shown in FIG. 12 constitutes no limitation on the UE, and the UE may include more or fewer components than those shown in the figure, or some components may be combined, or a different component deployment may be used, which are not described herein again.

It is to be understood that, in this embodiment of this application, the input unit 104 may include a graphics processing unit (GPU) 1041 and a microphone 1042, and the graphics processing unit 1041 processes static pictures or video image data obtained by an image capturing device (such as a camera) in a video capturing mode or an image capturing mode. The display unit 106 may include a display panel 1061, and the display panel 1061 may be configured by using a liquid crystal display, an organic light-emitting diode, or the like. The user input unit 107 includes a touch panel 1071 and another input device 1072. The touch panel 1071 is also referred to as a touch screen. The touch panel 1071 may include two parts: a touch detection apparatus and a touch controller. The another input device 1072 may include, but is not limited to, a physical keyboard, a functional key (such as a volume control key or a switch key), a track ball, a mouse, and a joystick, which are not described herein again.

In this embodiment of this application, the radio frequency unit 101 receives downlink data from a network device and transmits the downlink data to the processor 110 for processing; and in addition, transmits uplink data to the network device. Generally, the radio frequency unit 101 includes, but is not limited to, an antenna, at least one amplifier, a transceiver, a coupler, a low noise amplifier, a duplexer, and the like.

The memory 109 may be configured to store a software program or instruction and various data. The memory 109 may mainly include a program or instruction storage area and a data storage area. The program or instruction storage area may store an operating system, an application program or instruction required by at least one function (for example, a sound playback function and an image display function), and the like. In addition, the memory 109 may include a high speed random access memory, and may further include a non-volatile memory, where the non-volatile memory may be a read-only memory (ROM), a programmable ROM (PROM), an erasable PROM (EPROM), an electrically EPROM (EEPROM), or a flash memory. For example, at least one magnetic disk storage device, a flash memory or another volatile solid-state storage device.

The processor 110 may include one or more processing units. Optionally, the processor 110 may integrate an application processor and a modem processor, where the application processor mainly processes an operating system, a user interface, an application program or instruction, and the like, and the modem processor mainly processes wireless communication, for example, a baseband processor. It may be understood that the foregoing modem may either not be integrated into the processor 110.

The radio frequency unit 101 is configured to receive a paging indication signal transmitted by a network device, where the paging indication signal is used for instructing a UE whether to detect a paging downlink control channel in K POs, the K POs are K POs after the paging indication signal is received, and K is a positive integer.

Optionally, the processor 110 is configured to determine, before the radio frequency unit 101 receives the paging indication signal transmitted by the network device, a first transmission resource of the paging indication signal accordinging to first information; and the radio frequency unit 101 is specifically configured to receive the paging indication signal on the first transmission resource, where the first information includes at least one of the following:

an index of an SSB associated with the paging indication signal;

a paging downlink control channel monitoring occasion in a PO; or a UE group in which the UE is located.

Optionally, the processor 110 is specifically configured to determine the first transmission resource according to an SSB index order on a second transmission resource based on an association sequence, where the second transmission resource includes a transmission resource of at least one paging indication signal; and the SSB index order is an order of the index of the SSB associated with the paging indication signal, and the association sequence is an association sequence of the SSB associated with the paging indication signal and the second transmission resource.

Optionally, the processor 110 is specifically configured to determine the first transmission resource according to the SSB index order on a preset time domain resource in the second transmission resource based on the association sequence. The preset time domain resource includes at least one of the following: a downlink slot, a special slot, a downlink symbol, or a flexible symbol.

Optionally, the radio frequency unit 101 is specifically configured to receive the paging indication signal on the first transmission resource based on a first QCL relationship, where the first QCL relationship is a QCL relationship between the paging indication signal and the SSB associated with the paging indication signal.

Optionally, the second transmission resource includes at least one of the following:

a transmission resource including all or a part of transmission symbols of the SSB;

a transmission resource having an offset of a preset time interval in time domain from a transmission resource of the SSB; or a transmission resource associated with the transmission resource of the SSB based on the association sequence.

Optionally, the association sequence includes at least one of the following: a time sequence, a frequency sequence, a time-preceding-frequency sequence, or a frequency-preceding-time sequence.

Optionally, the paging indication signal is a signal sequence, and the signal sequence occupies one or more OFDM symbols.

Optionally, the signal sequence occupies a plurality of OFDM symbols; and The radio frequency unit 101 is specifically configured to receive the signal sequence on the first transmission resource according to second information, where the second information includes at least one of the following: a generation manner for the signal sequence or a second QCL relationship. The generation manner is a manner for the network device to generate the signal sequence, and the second QCL relationship is a QCL relationship between a plurality of signal sequences transmitted on the plurality of OFDM symbols.

Optionally, the second information includes the generation manner for the signal sequence; and the processor 110 is further configured to determine, before the radio frequency unit 101 receives the signal sequence on the first transmission resource according to the second information, the generation manner according to third information, where the third information includes at least one of the following:

an index of a SFN in which the signal sequence is located;

an index of a slot in which the signal sequence is located;

an index of a symbol in which the signal sequence is located;

an index of an SSB associated with the signal sequence;

an instruction by the signal sequence of whether to detect a paging downlink control channel;

an index of a UE group detecting a paging downlink control channel;

an index of a first transmission resource transmitting the signal sequence;

a number of a cell on which the UE camps; or a number of a cell to which the network device transmits the paging indication signal.

Optionally, the radio frequency unit 101 is specifically configured to receive the paging indication signal on the first transmission resource in a case that the first transmission resource overlaps with a third transmission resource for performing a first event in time domain.

Optionally, N transmission occasions in the first transmission resource overlap with the third transmission resource in the time domain, and N is a positive integer; and the radio frequency unit 101 is specifically configured to receive the paging indication signal on the first transmission resource in a case that N is less than a second threshold.

Optionally, the first event includes at least one of the following: transmitting a random access channel, transmitting an MSG3, transmitting an HARQ-ACK of an MSG4, receiving an RAR, receiving an MSGB, receiving a downlink shared channel of an MSG4, receiving an RA-RNTI, receiving a downlink control channel scrambled by a TC-RNTI, receiving an SSB, receiving a CSI-RS, or receiving a TRS.

Optionally, the processor 110 is further configured to determine, before the radio frequency unit 101 receives the paging indication signal transmitted by the network device, a second power of the paging indication signal according to a first power, where the first power is a power of an SSB associated with the paging indication signal or a power of a paging downlink control channel associated with the paging indication signal; and the radio frequency unit 101 is specifically configured to receive the paging indication signal according to the second power.

Optionally, the second power is the same as the first power; or a difference between the second power and the first power is less than a first threshold; or the difference between the second power and the first power is a predefined value or a value indicated by the network device.

According to the UE provided in this embodiment of this application, the paging indication signal transmitted by the network device can indicate to the UE whether to detect a paging downlink control channel in the K POs after the paging indication signal is received. Therefore, the UE can determine whether to detect the paging downlink control channel according to the received paging indication signal. In this way, the UE can detect the paging downlink control channel in a PO indicated by the paging indication signal, so as to avoid unnecessary paging downlink control channel detection performed by the UE, thereby reducing the waste of power of the UE.

It is to be noted that, in this embodiment of this application, the receiving module 301 in the schematic structural diagram (i.e., FIG. 10) of the foregoing channel detection apparatus may be implemented by using the foregoing radio frequency unit 101; and the determining module 302 in the schematic structural diagram of the foregoing channel detection apparatus may be implemented by using the foregoing processor 110.

An embodiment of this application further provides a readable storage medium, storing a program or instruction, where when the program or the instruction is executed by a processor, each process of the foregoing channel detection method embodiments is implemented, and the same technical effect can be achieved, which is not described in detail herein again to avoid repetition.

The processor is the processor in the UE described in the foregoing embodiment. The readable storage medium includes a computer-readable storage medium, such as, a read-only memory (ROM), a random access memory (RAM), a magnetic disk, or an optical disk.

An embodiment of this application further provides a chip, including a processor and a communication interface, where the communication interface is coupled to the processor, and the processor is configured to run a network device program or instruction to implement each process of the foregoing channel detection method embodiments and the same technical effects can be achieved, which is not described in detail herein again to avoid repetition.

It is to be understood that the chip mentioned in this embodiment of this application may also be referred to as a system-level chip, a system chip, a chip system, an SoC chip, or the like.

It is to be noted that, the term "comprise", "include" or any other variation thereof in this specification is intended to cover a non-exclusive inclusion, which specifies the presence of stated processes, methods, objects, or apparatuses, but does not preclude the presence or addition of one or more other processes, methods, objects, or apparatuses. Without more limitations, elements defined by a sentence "including one" does not exclude that there are still other same elements in the process, method, object, or apparatus. In addition, it is to be noted that, the scope of the method and apparatus in the embodiments of this application is not limited to performing the functions in the order shown or discussed, but may also include performing the functions in a substantially simultaneous manner or in a reverse order according to the functions involved, for example, the described method may be performed in a sequence different from the described order, and various steps may also be added, omitted, or combined. In addition, features described with reference to certain examples may be combined in other examples.

Through the descriptions of the foregoing implementations, a person skilled in the art may clearly understand that the method according to the foregoing embodiments may be implemented by means of software and a necessary general hardware platform, and certainly, may also be implemented by hardware, but in many cases, the former manner is a better implementation. Based on such an understanding, the technical solutions of this application essentially or the part contributing to the prior art may be implemented in a form of a software product. The computer software product is stored in a storage medium (such as a ROM/RAM, a magnetic disk, or an optical disk) and includes several instructions for instructing a device (which may be a mobile phone, a computer, a server, an air conditioner, a network device, or the like) to perform the method described in the embodiments of this application.

The embodiments of this application are described above with reference to the accompanying drawings, but this application is not limited to the foregoing specific embodiments, which are merely illustrative rather than limited. Under the inspiration of this application, a person of ordinary skill in the art can make many forms without departing from the scope of this application and the protection of the claims, all of which fall within the protection of this application.

What is claimed is:

1. A channel detection method, comprising:
determining, by a user equipment (UE) according to first information, a time domain transmission resource of a paging indication signal transmitted by a network device, the first information comprising an index of a synchronization signal and physical broadcast channel block (SSB) associated with the paging indication signal;
receiving, by the UE, the paging indication signal on the determined time domain transmission resource, wherein the paging indication signal is used for instructing the UE whether to detect a paging physical downlink control channel (PDCCH) in K paging occasions (POs), the K POs are K POs after the paging indication signal is received, and K is a positive integer.

2. The method according to claim 1,
wherein the first information further comprises at least one of the following:
a paging PDCCH monitoring occasion in a PO; or
a UE group in which the UE is located.

3. The method according to claim 1, wherein the determining, by a user equipment (UE) according to first information, a time domain transmission resource of a paging indication signal transmitted by a network device comprises:
determining, by the UE, the time domain transmission resource according to an SSB index order on a second transmission resource based on an association sequence, wherein the second transmission resource comprises a transmission resource of at least one paging indication signal; and
the SSB index order is an order of the index of the SSB associated with the paging indication signal, and the association sequence is an association sequence of the SSB associated with the paging indication signal and the second transmission resource.

4. The method according to claim 3, wherein the determining, by the UE, the time domain transmission resource according to an SSB index order on a second transmission resource based on an association sequence comprises:
determining, by the UE, the time domain transmission resource according to the SSB index order on a preset time domain resource in the second transmission resource based on the association sequence, wherein
the preset time domain resource comprises at least one of the following: a downlink slot, a special slot, a downlink symbol, or a flexible symbol.

5. The method according to claim 3, wherein the second transmission resource comprises at least one of the following:
a transmission resource comprising all or a part of transmission symbols of the SSB;
a transmission resource having an offset of a preset time interval in time domain from a transmission resource of the SSB; or
a transmission resource associated with the transmission resource of the SSB based on the association sequence.

6. The method according to claim 3, wherein the association sequence comprises at least one of the following: a time sequence, a frequency sequence, a time-preceding-frequency sequence, or a frequency-preceding-time sequence.

7. The method according to claim 1, wherein the receiving, by the UE, the paging indication signal on the determined time domain transmission resource comprises:
receiving, by the UE, the paging indication signal on the determined time domain transmission resource based on a first quasi co-located (QCL) relationship, wherein the first QCL relationship is a QCL relationship between the paging indication signal and the SSB associated with the paging indication signal.

8. The method according to claim 1, wherein the paging indication signal is a signal sequence, and the signal sequence occupies one or more orthogonal frequency division multiplex (OFDM) symbols.

9. The method according to claim 8, wherein the signal sequence occupies a plurality of OFDM symbols; and
the receiving, by the UE, the paging indication signal on the determined time domain transmission resource comprises:
receiving, by the UE, the signal sequence on the determined time domain transmission resource according to second information, wherein
the second information comprises at least one of the following: a generation manner for the signal sequence or a second QCL relationship; and the generation manner is a manner for the network device to generate the signal sequence, and the second QCL relationship is a QCL relationship between a plurality of signal sequences transmitted on the plurality of OFDM symbols.

10. The method according to claim 9, wherein the second information comprises the generation manner; and
before the receiving, by the UE, the signal sequence on the determined time domain transmission resource according to second information, the method further comprises:
determining, by the UE, the generation manner according to third information, wherein the third information comprises at least one of the following:
an index of a system frame number (SFN) in which the signal sequence is located;
an index of a slot in which the signal sequence is located;
an index of a symbol in which the signal sequence is located;
an index of an SSB associated with the signal sequence;
an instruction by the signal sequence of whether to detect a paging PDCCH;
an index of a UE group detecting a paging PDCCH;
an index of a time domain transmission resource transmitting the signal sequence;
a number of a cell on which the UE camps; or
a number of a cell to which the network device transmits the paging indication signal.

11. The method according to claim 1, wherein the receiving, by the UE, the paging indication signal transmitted by the network device on the determined time domain transmission resource comprises:
receiving, by the UE, the paging indication signal on the determined time domain transmission resource in a case that the determined time domain transmission resource overlaps with a third transmission resource for performing a first event in time domain.

12. The method according to claim 11, wherein N transmission occasions in the time domain transmission resource overlap with the third transmission resource in the time domain, and N is a positive integer; and the receiving, by the UE, the paging indication signal on the determined time domain transmission resource comprises:

receiving, by the UE, the paging indication signal on the determined time domain transmission resource in a case that N is less than a second threshold.

13. The method according to claim 11, wherein the first event comprises at least one of the following:

transmitting a random access channel, transmitting an MSG3, transmitting a hybrid automatic repeat request acknowledgement (HARQ-ACK) of an MSG4, receiving a random access response (RAR), receiving an MSGB, receiving a downlink shared channel of an MSG4, receiving a random access radio network temporary identifier (RA-RNTI), receiving a PDCCH scrambled by a temporary cell radio network temporary identifier (TC-RNTI), receiving an SSB, receiving a channel state information reference signal (CSI-RS), or receiving a tracking reference signal (TRS).

14. The method according to claim 1, wherein before the receiving, by the UE, the paging indication signal transmitted by the network device, the method further comprises:

determining, by the UE, a second power of the paging indication signal according to a first power, wherein the first power is a power of the SSB associated with the paging indication signal or a power of the paging PDCCH associated with the paging indication signal; and the receiving, by the UE, the paging indication signal transmitted by the network device comprises:

receiving, by the UE, the paging indication signal according to the second power.

15. The method according to claim 14, wherein the second power is the same as the first power; or a difference between the second power and the first power is less than a first threshold; or the difference between the second power and the first power is a predefined value or a value indicated by the network device.

16. A user equipment (UE), comprising a processor, a memory, and instructions stored on the memory and runnable on the processor, wherein the instructions, when being executed by the processor, implements:

determining, according to first information, a time domain transmission resource of a paging indication signal transmitted by a network device, the first information comprising an index of a synchronization signal and physical broadcast channel block (SSB) associated with the paging indication signal;

receiving the paging indication signal on the determined time domain transmission resource, wherein the paging indication signal is used for instructing the UE whether to detect a paging PDCCH in K paging occasions (POs), the K POs are K POs after the paging indication signal is received, and K is a positive integer.

17. The UE according to claim 16, wherein the first information further comprises at least one of the following:

a paging PDCCH monitoring occasion in a PO; or a UE group in which the UE is located.

18. The UE according to claim 16, wherein the determining, according to first information, a time domain transmission resource of a paging indication signal transmitted by a network device comprises:

determining the time domain transmission resource according to an SSB index order on a second transmission resource based on an association sequence, wherein the second transmission resource comprises a transmission resource of at least one paging indication signal; and the SSB index order is an order of the index of the SSB associated with the paging indication signal, and the association sequence is an association sequence of the SSB associated with the paging indication signal and the second transmission resource.

19. The UE according to claim 16, wherein the receiving the paging indication signal on the determined time domain transmission resource comprises:

receiving the paging indication signal on the determined time domain transmission resource based on a first quasi co-located (QCL) relationship, wherein the first QCL relationship is a QCL relationship between the paging indication signal and the SSB associated with the paging indication signal.

20. The UE according to claim 16, wherein the instructions, when being executed by the processor, further implements:

before the receiving the paging indication signal transmitted by the network device, determining a second power of the paging indication signal according to a first power, wherein the first power is a power of the SSB associated with the paging indication signal or a power of the paging PDCCH associated with the paging indication signal; and wherein the receiving the paging indication signal transmitted by the network device comprises:

receiving the paging indication signal according to the second power.

* * * * *